Feb. 5, 1946.    F. SCHNEIDER    2,394,333
ELECTRIC STORAGE BATTERY
Filed Sept. 7, 1940
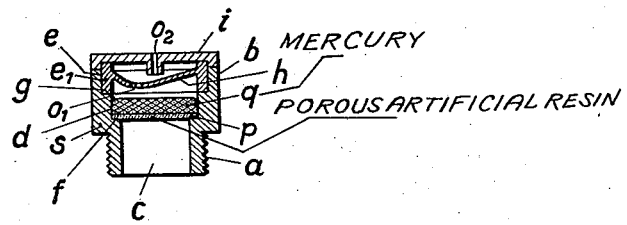
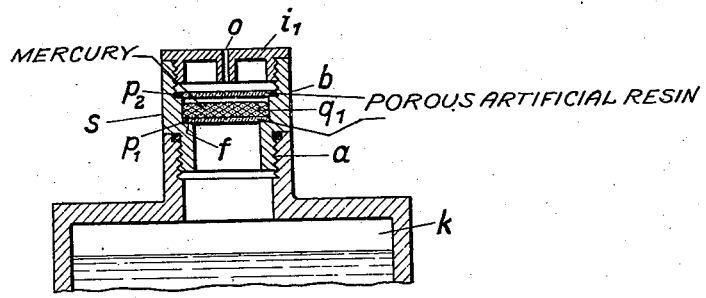
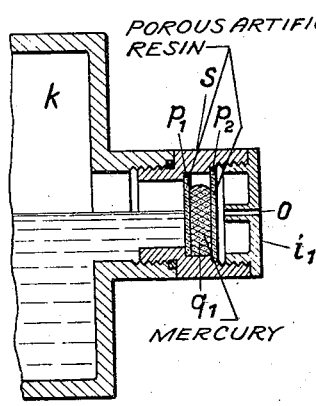
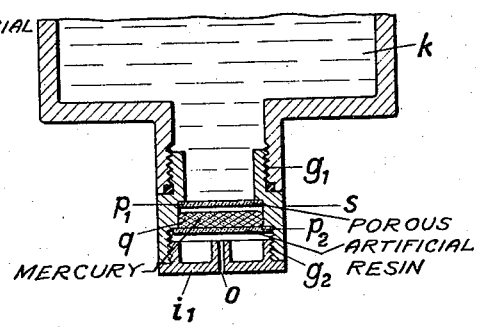
Inventor:
Friedrich Schneider
by  Franz Reichard
Attorney Patented Feb. 5, 1946

2,394,333

UNITED STATES PATENT OFFICE 2,394,333

ELECTRIC STORAGE BATTERY

Friedrich Schneider, Hagen, Germany; vested in the Alien Property Custodian

Application September 7, 1940, Serial No. 355,709
In Germany August 12, 1939

5 Claims. (Cl. 136—179)

My invention relates to improvements in electric storage batteries, particularly alkaline storage batteries, and more particularly in vents for such batteries which are based on the use of a plate having minute pores and a layer of mercury placed thereon. As is known in the art, plates of sufficiently fine porosity, such for example as glass frits in which the pores have a width of from 5 to 15 thousands of a millimeter, can be used as mercury check vents with pressures of about 1.5 atmospheres. However, heretofore the use of such vents in electric storage batteries was not possible, because the mercury is affected by vapors of sulphuric acid and oxygen, and because the glass frits which heretofore were universally used in such vents were not sufficiently stable as against the strong lye of alkaline storage batteries. Further, frits now in use are readily wetted by sulphuric acid as well as by potash lye, whereby the gas pressure at which the wetted frits permit the passage of the gas is increased to a multiple of that of dry frits so that an objectionable gas pressure can be developed in the cells.

The object of the improvements is to provide a vent in which the above-named objections are obviated, and with this object in view my invention consists in providing a vent for electric storage batteries and more particularly for alkaline storage batteries, in which the plates of fine porosity consist of a frit of a substance, preferably artificial resin, which has humidity repelling property, and which therefore is not wetted, the said frits being preferably made from polystyrol and polymethacrylic acid ester. Further, a body of fine porosity may be made from a material which is capable of being wetted or of being affected by the vapors, in which however the surface and the walls of the pores have a coating of humidity repellent and stable material.

For the purpose of explaining the invention several examples embodying the same have been shown in the accompanying drawing, in which the same letters of reference have been used in all the views to indicate corresponding parts.

In said drawing:

Fig. 1 is a sectional elevation of the vent,

Fig. 2 is a sectional elevation illustrating a modification, the figure showing the vent as mounted on a cell, and Figs. 3 and 4 are sectional elevations of the vent shown in Fig. 2 and illustrating the cell and vent in tilted positions.

In Fig. 1 I have illustrated a vent which is suitable for use in normal alkali cells, the object of the vent being to prevent the access of obnoxious carbonic acid to the cells.

As shown in the said figure the vent comprises a tubular body $s$ having an externally screw-threaded portion $a$ of smaller diameter and a portion $b$ of larger diameter. Internally the body $s$ comprises three chambers $c$, $d$ and $e$ of different diameters whereby shoulders $f$ and $g$ are formed. Within the chamber $d$ and on the shoulder $f$ there is a porous plate $p$ which provides a support for a layer $q$ of mercury. The porous plate consists of the materials referred to above, that is either a frit of high porosity of a material which has humidity repelling property such as artificial resin, and which is not affected by the vapors rising from the cell, or of a material which may or may not be humidity repellent or proof against the action of the said vapors, in which however the surface and the walls of the pores have a coating of humidity repellent and stable material. Preferred coating substances are also the aforesaid substances artificial resin such as polystyrol and polymethacrylic acid ester. Above the layer $q$ of mercury an annular body $e$ formed with a partition $h$ having a vent $o_1$ is fitted within the chamber $e$, and the said annular body is covered by a cap $i$ having a vent $o_2$.

In the operation of the vent mounted on the cell of a storage battery gases of sulphuric acid and oxygen which may develop within the cell escape through the porous plate $p$ and the body of mercury $q$ so that excessive pressure can not be built up within the cell. By reason of the humidity repelling property of the pores of the plate $p$ liquid particles of the gases are held back by the plate $p$. Dry gases of sulphuric acid and oxygen are not able to spoil the body of mercury $q$, while the said mercury is spoiled by humid vapors of sulphuric acid and oxygen. Therefore, by providing the humidity repelling plate $p$ the body of mercury $q$ is not injured and therefore I am enabled to provide the porous plate $p$ in combination with the body $q$ of mercury. The said body of mercury has the function to prevent access of carbonic acid of the outer air to the cell, which carbonic acid would be detrimental to the electrolyte.

In Figs. 2 to 4 I have shown a modification of the vent which may be used in any upright or tilted positions of the cell. The body $s$ of the vent has been shown fixed to a cell $k$. Its construction is substantially the same as that of the body shown in Fig. 1 and the same letters of reference have been used to indicate corresponding parts. The body of mercury $q_1$ is confined between a lower plate $p_1$ mounted on the shoulder $f$, and an upper plate $p_2$ of similar material and of high porosity the plate $p_2$ being slightly spaced from the body $q_1$ of mercury. The body of the vent is closed by a screw cap $i_1$ having a vent $o$. By thus providing the cap $i_1$ which may be readily removed, access can be had to the plates $p_1$ and $p_2$ and the body of mercury $q_1$ for cleaning the plates or replacing the same by new plates.

Fig. 3 shows the cell turned sidewise into horizontal position. The volume of the body $q_1$ of mercury is such that a slight passage is left above the body of mercury and through the portions of the plates $p_1$ and $p_2$ located above the same. In Fig. 4 I have shown the cell in a position turned upside down, in which position the plate $p_1$ prevents the liquid electrolyte from leaking from the cell.

I claim:

1. A storage battery comprising a cell containing a liquid electrolyte, and a vent in the wall of said cell, said vent comprising a tubular body carried by the said wall, a plate of fine porosity fitted within said body, the walls of the pores of said plate having humidity-repellent surfaces, and a body of mercury adapted to cover the face of said plate remotely disposed from the electrolyte whereby said mercury will be protected from the humidity of the electrolyte.

2. In a battery as defined in claim 1, the further improvement described herein, which consists in the said plate being made from humidity-repellent material.

3. In a battery as defined in claim 1, the further improvement described herein, which consists in the plate being made from artificial resin and in which said electrolyte is alkaline.

4. In a battery as defined in claim 1, the further improvement described herein, which consists in the said plate being coated at its surface and that of the walls of its pores with a humidity-repellent material.

5. A storage battery, comprising a cell containing an electrolyte, and a vent in the wall of said cell, said vent comprising a tubular body carried by said wall, a plate of fine porosity fitted within said body, the walls of the pores of said plate having humidity-repellent surfaces, a body of mercury adapted to cover said plate, and a second plate of fine porosity fitted in said tubular body outside said first-named plate and said body of mercury, said plates forming a chamber which is partly filled by said body of mercury.

FRIEDRICH SCHNEIDER.